United States Patent
Chaudhuri et al.

(10) Patent No.: US 9,596,609 B2
(45) Date of Patent: Mar. 14, 2017

(54) METHODS AND SYSTEMS FOR DETERMINING RADIO COVERAGE IN WIRELESS COMMUNICATION NETWORKS

(71) Applicants: Saptarshi Chaudhuri, Bangalore (IN); Avijit Manna, Kolkata (IN); Shyam Sundar Pal, Kolkata (IN)

(72) Inventors: Saptarshi Chaudhuri, Bangalore (IN); Avijit Manna, Kolkata (IN); Shyam Sundar Pal, Kolkata (IN)

(73) Assignee: WIPRO LIMITED, Bangalore (IN)

( * ) Notice: Subject to any disclaimer, the term of this patent is extended or adjusted under 35 U.S.C. 154(b) by 86 days.

(21) Appl. No.: 14/748,182

(22) Filed: Jun. 23, 2015

(65) Prior Publication Data
US 2016/0269912 A1 Sep. 15, 2016

(30) Foreign Application Priority Data
Mar. 11, 2015 (IN) ............................. 1203/CHE/2015

(51) Int. Cl.
| H04W 24/00 | (2009.01) |
| H04W 4/00 | (2009.01) |
| H04W 16/18 | (2009.01) |
| H04W 24/10 | (2009.01) |
| H04W 16/24 | (2009.01) |
| H04W 88/08 | (2009.01) |

(52) U.S. Cl.
CPC ........... *H04W 16/18* (2013.01); *H04W 16/24* (2013.01); *H04W 24/10* (2013.01); *H04W 88/08* (2013.01)

(58) Field of Classification Search
CPC ..... H04W 24/08; H04W 36/30; H04W 24/00; H04W 88/02; H04W 4/02
USPC ............................ 455/436–444, 432.1–432.3
See application file for complete search history.

(56) References Cited

U.S. PATENT DOCUMENTS

| 6,799,047 B1 * | 9/2004 | Bahl | G01C 21/206 |
| | | | 455/456.1 |
| 2005/0014518 A1 * | 1/2005 | Spain, Jr. | H04W 64/00 |
| | | | 455/456.5 |
| 2008/0085692 A1 * | 4/2008 | Hart | H04W 16/20 |
| | | | 455/187.1 |
| 2015/0133148 A1 * | 5/2015 | Yang | G06F 17/30289 |
| | | | 455/456.1 |

(Continued)

FOREIGN PATENT DOCUMENTS

| GB | 2406472 A * | 3/2005 | ............ H04W 16/00 |

*Primary Examiner* — Dung Hong
(74) *Attorney, Agent, or Firm* — Finnegan, Henderson, Farabow, Garrett & Dunner LLP

(57) ABSTRACT

This disclosure relates generally to wireless communication networks, and more particularly to methods and systems for determining radio coverage in wireless communication networks. In one embodiment, a method for determining radio coverage in a wireless communication network is disclosed. The method includes categorizing each of a plurality of micro zones within coverage area of a Base Station (BS) as one of a User Equipment (UE) micro zone and a blind micro zone based on signal measurement reports associated with the plurality of micro zones. The method further includes estimating signal quality of a blind micro zone within the plurality of micro zones based on signal quality of at least one set of neighboring micro zones surrounding the blind micro zone.

25 Claims, 7 Drawing Sheets

(56) References Cited

U.S. PATENT DOCUMENTS

2016/0182164 A1\* 6/2016 Wang .................. H04B 17/318
　　　　　　　　　　　　　　　　　　455/423
2016/0192151 A1\* 6/2016 Marri Sridhar ....... H04W 4/025
　　　　　　　　　　　　　　　　　　455/418

\* cited by examiner

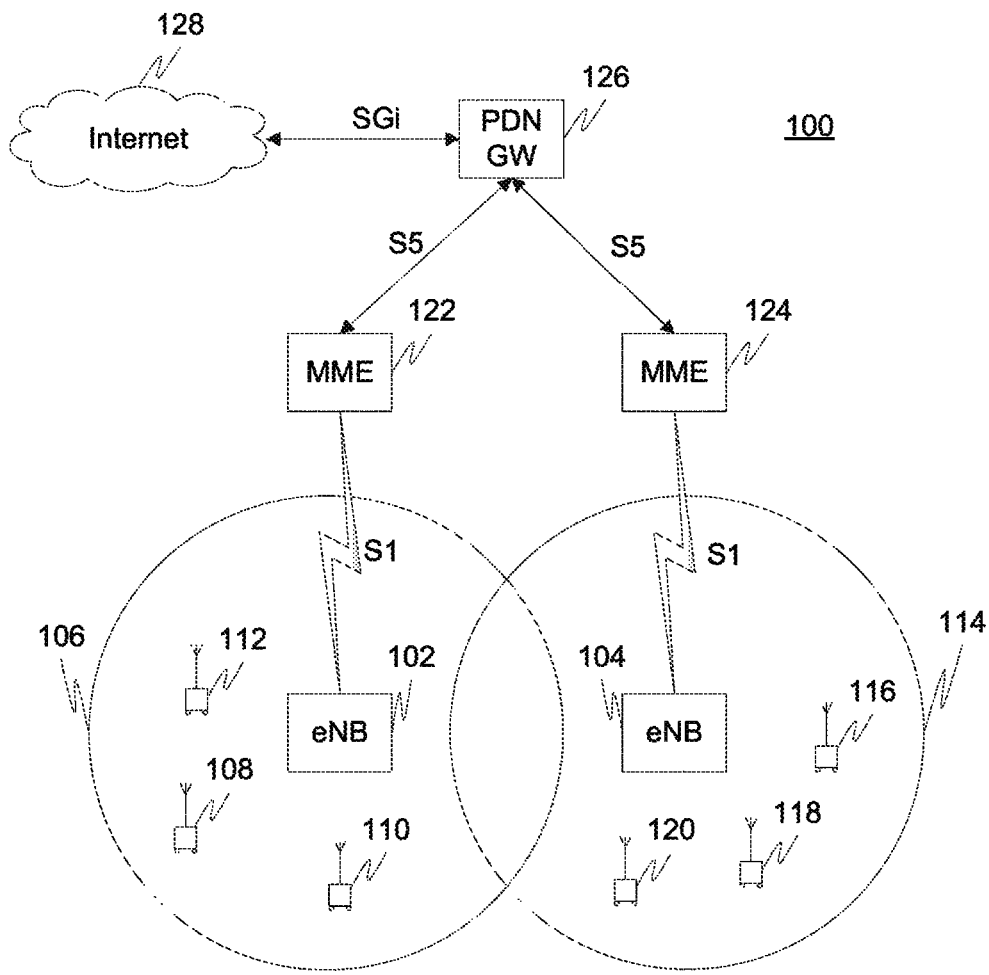
FIG. 1: Methods And Systems For Determining Radio Coverage In Wireless Communication Networks

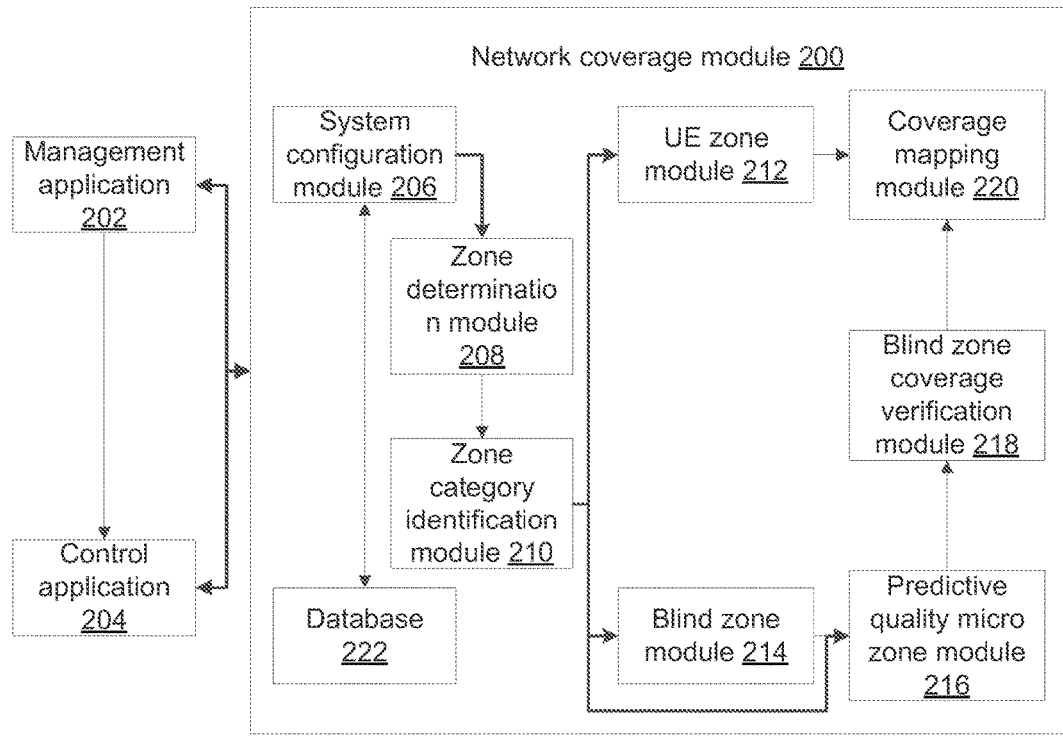
FIG. 2: Methods And Systems For Determining Radio Coverage In Wireless Communication Networks

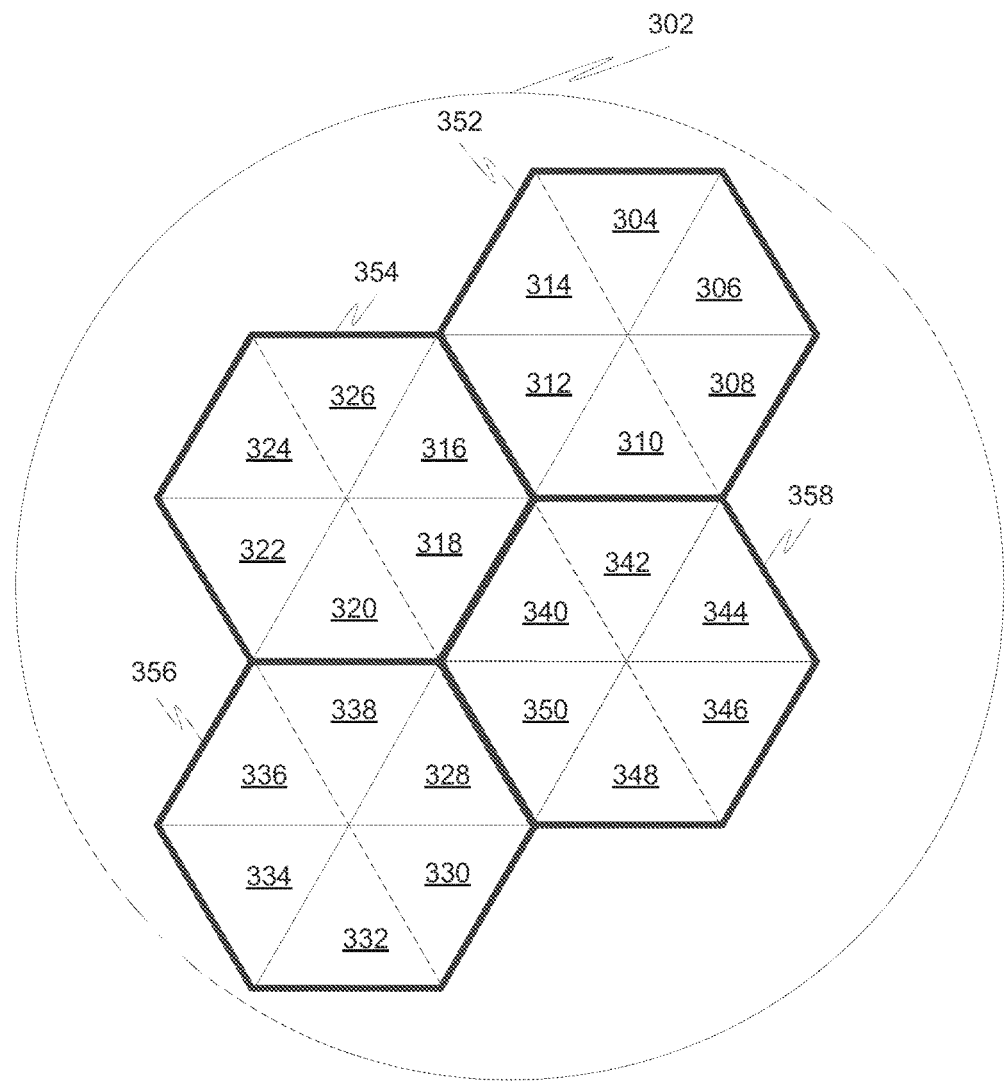
FIG. 3: Methods And Systems For Determining Radio Coverage In Wireless Communication Networks

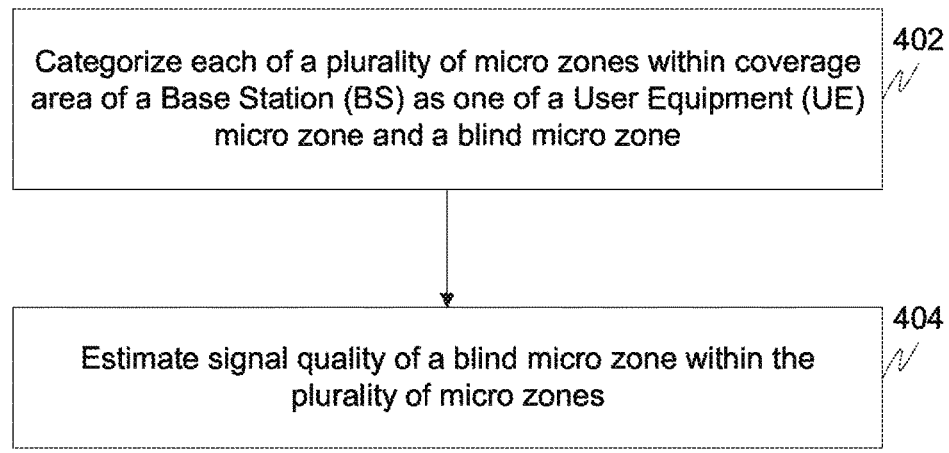
FIG. 4: Methods And Systems For Determining Radio Coverage In Wireless Communication Networks

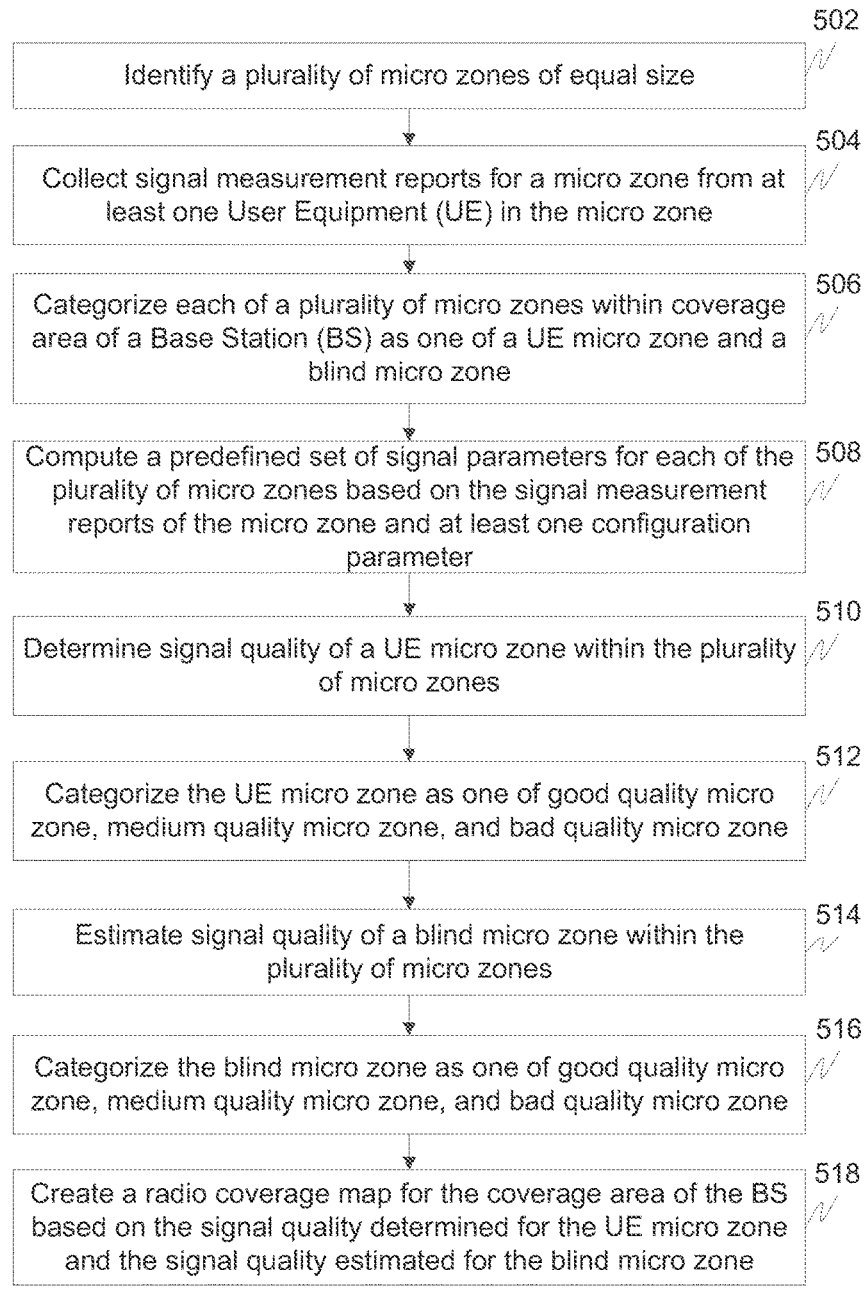
FIG. 5: Methods And Systems For Determining Radio Coverage In Wireless Communication Networks

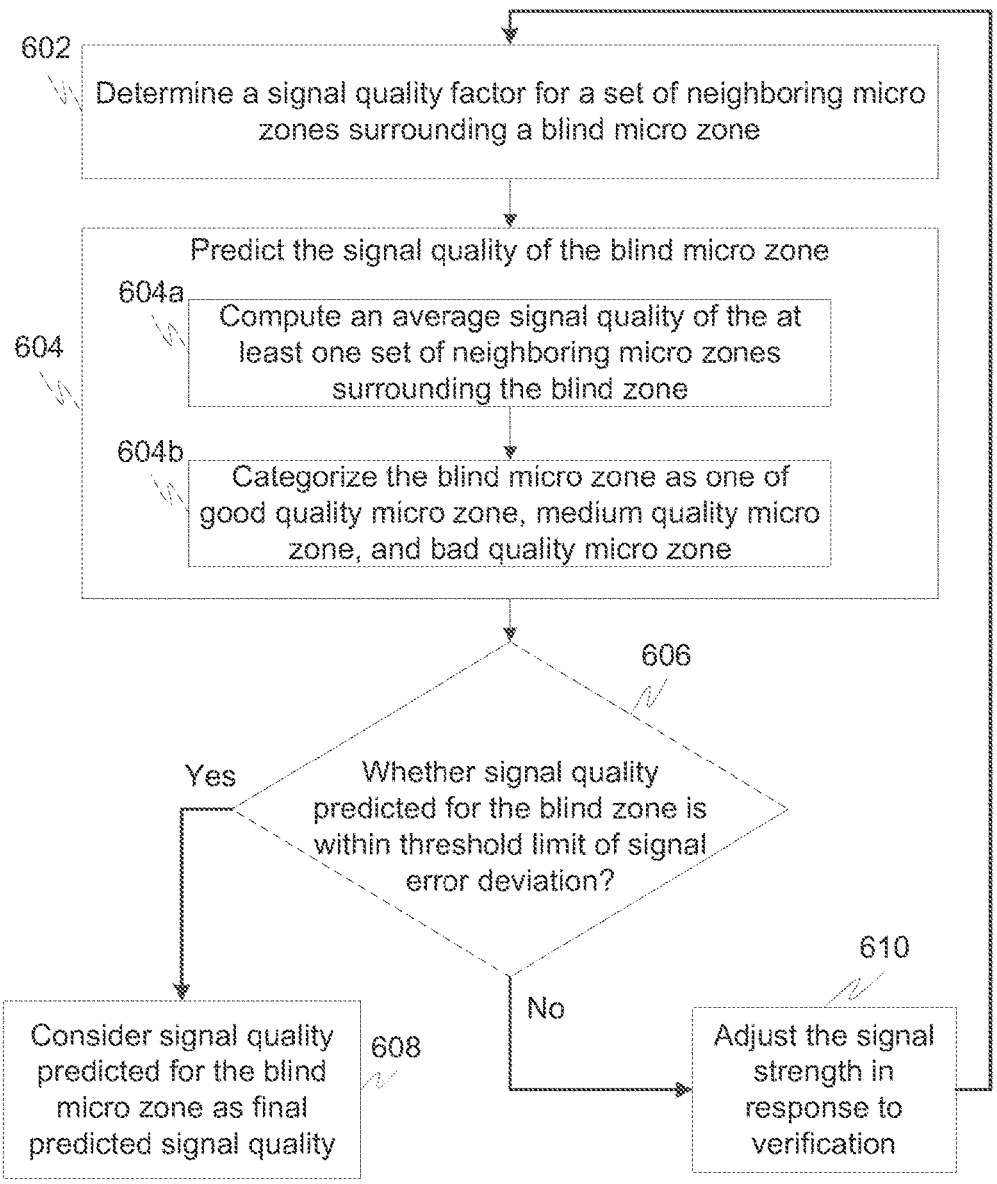
FIG. 6: Methods And Systems For Determining Radio Coverage In Wireless Communication Networks

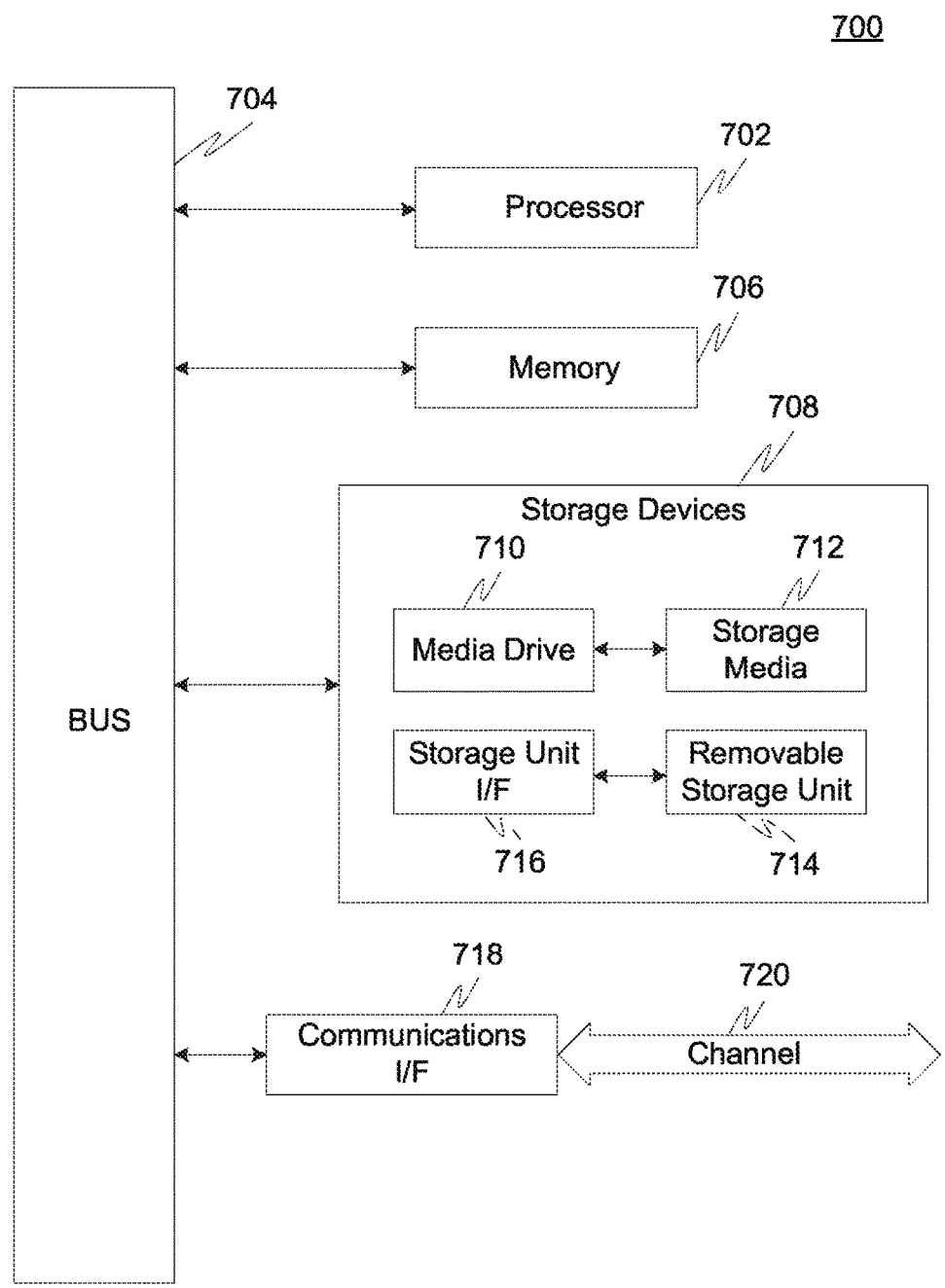
FIG. 7: Methods And Systems For Determining Radio Coverage In Wireless Communication Networks

METHODS AND SYSTEMS FOR DETERMINING RADIO COVERAGE IN WIRELESS COMMUNICATION NETWORKS

PRIORITY CLAIM

This U.S. patent application claims priority under 35 U.S.C. §119 to: India Application No. 1203/CHE/2015, filed Mar. 11, 2015. The entire content of the aforementioned application is incorporated herein by reference.

TECHNICAL FIELD

This disclosure relates generally to wireless communication networks, and more particularly to methods and systems for determining radio coverage in wireless communication networks.

BACKGROUND

In a Long Term Evolution (LTE) networks, automatic optimization of the wireless network to reduce operating cost is comparatively complex when compared to other wireless networks. The complexity is because of requirement of multiple network and geographical parameters. Initially, the primary focus in implementation of LTE networks was on the radio coverage. However, with the increase in the number of subscriber and corresponding increase in demand of service, it had become a challenge to increase capacity of the LTE network to the expected levels without compromising the quality of service.

To solve this problem, conventional methods and systems employed a motor vehicle equipped with network measurement devices to measure different network parameters within different parts of the coverage area. These parameters so captured were later used to optimize the coverage area in the LTE network. However, not only is this method cost intensive but highly inaccurate and unreliable. Therefore, there is a need for a method and system that can more efficiently and effectively determine the radio coverage in LTE networks.

SUMMARY

In one embodiment, a method for determining radio coverage in a wireless communication network is disclosed. The method includes categorizing each of a plurality of micro zones within coverage area of a Base Station (BS) as one of a User Equipment (UE) micro zone and a blind micro zone based on signal measurement reports associated with the plurality of micro zones. The method further includes estimating signal quality of a blind micro zone within the plurality of micro zones based on signal quality of at least one set of neighboring micro zones surrounding the blind micro zone. The signal quality of each set of neighboring micro zones is determined based on a predefined set of signal parameters extracted from corresponding signal measurement reports.

In another embodiment, a system for determining radio coverage in a wireless communication network is disclosed. The system includes a processor configured to categorize each of a plurality of micro zones within coverage area of a BS as one of a UE micro zone and a blind micro zone based on signal measurement reports associated with the plurality of micro zones. The processor is further configured to estimate signal quality of a blind micro zone within the plurality of micro zones based on signal quality of at least one set of neighboring micro zones surrounding the blind micro zone. The signal quality of each set of neighboring micro zones is determined based on a predefined set of signal parameters extracted from corresponding signal measurement reports.

In yet another embodiment, a non-transitory computer-readable storage medium for determining radio coverage in a wireless communication network is disclosed, such that when executed by a computing device, the non-transitory computer-readable storage medium cause the computing device to categorize each of a plurality of micro zones within coverage area of a BS as one of a LIE micro zone and a blind micro zone based on signal measurement reports associated with the plurality of micro zones; and estimate signal quality of a blind micro zone within the plurality of micro zones based on signal quality of at least one set of neighboring micro zones surrounding the blind micro zone, wherein the signal quality of each set of neighboring micro zones is determined based on a predefined set of signal parameters extracted from corresponding signal measurement reports.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 illustrates an exemplary wireless communication network in which various embodiments may function.

FIG. 2 is a block diagram illustrating communication of various components of network coverage module with a management application and a control application in a Base Station (BS), in accordance with an embodiment.

FIG. 3 illustrates a portion of coverage area of a BS divided into micro zones and macro zones, in accordance with an exemplary embodiment.

FIG. 4 illustrates a flowchart of a method for determining radio coverage in a wireless communication network, in accordance with an embodiment FIG. 5 illustrates a flowchart of a method for determining radio coverage in a wireless communication network, in accordance with another embodiment.

FIG. 6 illustrates a flowchart of a method for estimating signal quality of a blind micro zone, in accordance with an embodiment.

FIG. 7 illustrates an exemplary computing system that may be employed to implement processing functionality for various embodiments.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Additional illustrative embodiments are listed below. In one embodiment, an exemplary wireless communication network 100 in which various embodiments may function is illustrated in FIG. 1. Wireless communication network 100 is a Long Term Evolution (LTE) network that includes an Evolved Node Base station (eNB) 102 and an eNB 104. eNB 102 has a coverage area 106 and communicates wirelessly with User Equipment (UE) 108, a UE 110, and a UE 112 within coverage area 106. eNB 104 has a coverage area 114 and communicates wirelessly with LIE 116, 118, and 120 within coverage area 114. Examples of a UE may include but are not limited to a cell phone, a smart phone, a tablet, a phablet, and a laptop. eNB 102 and eNB 104 form the evolved UMTS Terrestrial Radio Access Network (E-UTRAN) for the wireless communication network 100.

The eNB 102 wirelessly communicates with a Mobility Management Entity (MME) 122 and eNB 104 wirelessly communicates with a MME 124 using respective S1 interfaces. Each of MME 122 and MME 124 may be replaced by a Serving Gateway (S-GW). Each of MME 122 and MME 124 further communicate with a Packet Data Network Gateway (PDN-GW) 126 through respective S5 interfaces. PDN-GW 126 further connects wireless communication network 100 with Internet 128 through an SGi link.

It will be apparent to a person skilled in the art that wireless communication network 100 is not limited to an LTE network and may include but is not limited to Worldwide Interoperability for Microwave Access (WiMAX), Code Division Multiple Access (CDMA), Enhanced Data rates for GSM Evolution (EDGE), and High Speed Packet Access (HSPA). It will be further apparent to a person skilled in the art that for a wireless communication network other than LTE, network components and parameters associated with that wireless communication network will be used.

FIG. 2 is a block diagram illustrating communication of various components of a network coverage module 200 with a management application 202 and a control application 204 in a Base Station (BT), in accordance with an embodiment. Network coverage module 200 includes a system configuration module 206, a zone determination module 208, a zone category identification module 210, a UE zone module 212, a blind zone module 214, a predictive quality micro zone module 216, a blind zone coverage verification module 218, and a coverage mapping module 220.

To determine the radio coverage, the system configuration module 206 collects a plurality of configuration parameters associated with the wireless communication network 100 that includes the BS. To this end, system configuration module 206 communicates with the control application 204 and the management application 202. Examples of the plurality of configuration parameter may include, but are not limited to a threshold number of signal measurement reports, a timer for algorithm trigger, a micro zone stale timer, BS transmission power, size of a micro zone, signal quality factor of a micro zone, good quality zone threshold, bad quality zone threshold, distance factor of a micro zone, a quality factor for a macro zone, and a number of sectors within the coverage area of the BS. In an embodiment, the plurality of configuration parameters are represented and described below in Table 1:

TABLE 1

| Configuration Parameter | Symbol | Description |
| --- | --- | --- |
| Threshold number of signal measurement reports | $\alpha_{Th\_R}$ | This configuration parameter is received from management application 202 and is representative of a predefined threshold number of signal measurement reports received from a micro zone within a coverage area of a BS. The shape of a micro zone, for example, may be that of an equilateral triangle, such that six micro zones tessellate to form a hexagonal macro zone. Multiple hexagonal macro zones further tessellate to overlay maximum coverage area of the BS. |
| Timer for algorithm trigger | $\delta_{Atrn}$ | This configuration parameter is the timer duration for triggering an algorithm to collect signal measurement reports from a micro zone within coverage area of the BS. On expiry of this timer, quality of signal received by UEs within the micro zone is determined. |
| Micro zone stale timer | $\phi_{Stm}$ | This configuration parameter is the timer duration for collecting signal measurement report from a micro zone within the coverage area of the BS. This timer starts when the number of signal measurement reports for a micro zone has reached a predefined threshold number of signal measurement reports. |
| BS transmission power | $\rho_{BS\_Tx}$ | This configuration parameter is received from management application 202 and is used for calculating the coverage area of the BS by determining the Cell Radius, i.e., $Cell_{Rad}$. |
| Size of micro zone | $\omega_{Sz}$ | This configuration parameter is representative of the size of an equilateral triangular micro zone within the coverage area of the BS. The area of a micro zone is calculated in such a way that micro zones will tessellate to overlay maximum portion of the coverage area of the BS. In an exemplary embodiment, the size of a micro zone may be calculated using equation 1 given below: $(\sqrt{3}/4) * (Cell_{Rad}/n)^2 \ldots (1)$ where, n is the number of divisions for Cell Radius ($Cell_{Rad}$). For example, n = 2, 4, 8, . . . , m |
| Signal quality factor of a micro zone | $\Omega_{Micro\_Q}$ | This configuration parameter is used to compute the overall signal quality of a micro zone and is determined based on the average Radio Link Failure (RLF) and Handover Failure (HF) for that micro zone. |

TABLE 1-continued

| Configuration Parameter | Symbol | Description |
|---|---|---|
| Good quality zone threshold | $\gamma_{Th\_GQ}$ | This configuration parameter is used to identify good quality micro and macro zones. |
| Bad quality zone threshold | $\pi_{Th\_BQ}$ | This configuration parameter is used to identify bad quality micro and macro zones. |
| Distance factor of a micro zone | $\beta_{Micro\_Dist}$ | This configuration parameter is representative of distance of a micro zone and a macro zone that includes the micro zone from the BS. |
| Quality factor for a macro zone | $\mu_{Macro\_Q}$ | This configuration parameter is used to compute the overall signal quality of a macro zone and is determined based on average RLF and average HF of the macro zone. |
| Number of sectors within the coverage area of the BS | $\sigma_{BS\_Sec}$ | This configuration parameter is representative of the total number of sectors for the BS and is further used to calculate the number of micro zones within each sector. |

The information regarding the plurality of configuration parameters collected by the system configuration module 206 is stored in a database 222 in the network coverage module 200. Database 222 further includes information corresponding to predefined set of signal parameters which may include but are not limited to average HF, average RLF, Reference Signal Received Power (RSRP), and average signal strength, and the quality factor for a macro zone.

Zone determination module 208 determines the cell radius of the coverage area of the BS and the number of micro zones within the coverage area. To determine the cell radius, zone determination module 208 extracts the BS transmission power, i.e., $\rho_{BS\_Tx}$, from the database 222. Further, to determine a plurality of micro zones within the coverage area of the BS, zone determination module 208 extracts the configuration parameter of the number of sectors, i.e., $\sigma_{BS\_Sec}$, from the database 222. Each micro zone may have a shape such that the plurality of micro zones tessellate to overlay maximum coverage area of the BS. Thereafter, the zone determination module 208 identifies a plurality of macro zones, such that, each macro zone is a collation of one or more micro zones. In an embodiment, each micro zone has a shape of an equilateral triangle. In this case, each macro zone is Hexagonal in shape and is made by collating six micro zones. The creation of micro and macro zones has been explained in detail in the exemplary embodiment given in FIG. 4.

Thereafter, zone determination module 208 receives signal measurement reports from a plurality of UEs within the plurality micro zones. Using these signal measurement reports, zone determination module 208 extracts the RSRP, the RLF, and the HF values for each of the plurality of micro zones. Additionally, zone determination module 208 compares the number of signal measurement reports with the threshold number of signal measurement reports.

The information regarding the plurality of micro zones and the plurality of macro zones is communicated to zone category identification module 210, which performs a check to determine whether one or more signal measurement reports have been received from UEs within each micro zone. Based on presence of signal measurement reports, zone category identification module 210 categorizes a micro zone as a UE micro zone or a blind micro zone. A UE micro zone is that micro zone for which one or more signal measurement reports have been received. On the other hand, a blind micro zone is that micro zone for which no signal measurement report has been received.

After categorization of each micro zone as a UE micro zone and a blind micro zone, UE zone module 212 performs a check to determine whether the number of signal measurement reports received from a particular UE micro zone satisfies the threshold number of signal measurement report, i.e., $\sigma_{Th\_R}$. If this criterion is satisfied, UE zone module 212 computes a predefined set of signal parameters that includes but are not limited to average signal strength, the RSRP, average RLF, and average HF for that LIE micro zone. This computation is repeated for each LIE micro zone within the coverage area of the BS. For example, if the threshold number of signal measurement reports is fixed at ten, then LIE zone module 212 will compute the predefined set of signal parameters for a LIE micro zone, only when the total number of signal measurement reports received from that UE micro zone is greater than or equal to ten.

After computing the predefined set of signal parameters, LIE zone module 212 categories each UE micro zone as good quality UE micro zone, medium quality LIE micro zone, and bad quality UE micro zone based on a comparison with configurations parameters that include the good quality zone threshold, i.e., $\gamma_{TH\_CQ}$, and the bad quality zone threshold, i.e., $\pi_{Th\_BQ}$. In an exemplary embodiment, if the signal quality of a LIE micro zone computed based on the predefined set of signal parameters associated with it is greater than or equal to the good quality zone threshold, i.e., $\gamma_{Th\_GQ}$, the UE micro zone is categorized as good quality micro zone. Further, if the signal quality of a UE micro zone is between the good quality zone threshold, i.e., $\gamma_{Th\_GQ}$, and bad quality zone threshold, i.e., $\pi_{Th\_BQ}$, the UE micro zone is categorized as a medium quality UE micro zone. However, if the signal quality of the UE micro zone is less than or equal to the bad quality zone threshold, i.e., $\pi_{Th\_BQ}$, the UE micro zone is categorized as bad quality micro zone. The threshold for good quality zone and the threshold for bad quality zone are determined based on signal strength of the BS.

With regards to blind micro zones, blind zone module 214 communicates with zone category identification module 210 to receive information regarding blind micro zones in the coverage area of the BS. To estimate signal quality for each blind micro zone, for every timer for algorithm trigger, i.e., $\delta_{Atm}$, blind zone module 214 adjusts or recalculates a quality factor for macro zone, i.e., $\mu_{Macro\_Q}$, for each micro zone within the coverage area of the BS.

To adjust or recalculate quality factor for macro zone, blind zone module 214 firstly determines the number of macro zones for each sector within the coverage area of the BS. Thereafter, for a particular macro zone, blind zone module 214 selects a UE micro zone within that macro zone for which maximum number of signal measurement reports has been received. Based on these signal measurement reports, blind zone module 214 computes actual macro zone signal quality, i.e., $Q_{mi\_act}$, for that macro zone. Additionally, for selected UE micro zone, blind zone module 214 estimates signal quality, i.e., $Q_{mi\_est}$, of a set of neighboring micro zones surrounding the selected UE micro zones. In an exemplary embodiment, a set of neighboring micro zone is a hexagonal macro zone that includes six micro zones of the shape of equilateral triangles of the same size. In this exemplary embodiment, blind zone module 214 estimates signal quality of four macro zones surrounding the selected UE micro zone. Blind micro zone 214 then computes a deviation value for signal quality, i.e., $Q_{Dev}$, which is represented in equation 2 given below:

$$\text{Dev}=(Q_{mi\_act}-Q_{mi\_est}) \quad (2)$$

Blind zone module 214 then compares this deviation value with a threshold deviation, i.e., $Q_{Dev\_Th}$, which is determined based on signal strength of the BS. In an embodiment, if deviation so calculated is not within the desired limits, bind zone module 214 recalculates the quality factor for macro zone, i.e., $\mu_{Macro\_Q}$, for each time for algorithm trigger, i.e., $\delta_{Atm}$. Blind zone module 214 then communicates quality factors for macro zones computed for each micro zone to predictive quality micro zone module 216.

Predictive quality micro zone module 216 communicates with zone category identification module 210 to receive information regarding the plurality of micro zones within the coverage area of the BS. Thereafter, for each micro zone, predictive quality micro zone module 216 computes average signal quality for one or more set of neighboring micro zones, for which, predictive quality micro zone module 216 uses average signal strength, average RLF, and average HF of the one or more set of neighboring micro zones and quality factor for macro zone determined for each of the one or more set of neighboring micro zones. Additionally, predictive quality micro zone module 216 uses average RLF and average HF of a sector comprising the one or more set of neighboring micro zones to compute the average signal quality.

In an exemplary embodiment, a set of neighboring micro zone may be a macro zone. In this embodiment, for a particular micro zone, predictive quality micro zone module 216 identifies four such macro zones surrounding the micro zone and performs the above described computations with respect to these four macro zones. Thereafter, predictive quality micro zone 216 calculates average signal quality of these four macro zones covering that particular micro zone. The advantage of using four macro zones is that the particular micro zone for which the average signal quality is being predicted is completely surrounded by the four macro zones, thus resulting in a more accurate prediction.

After prediction of signal quality of each micro zone, predictive quality micro zone 216 categories each micro zone, which may be a blind micro zone or a LIE micro zone, as good quality micro zone, medium quality micro zone, and bad quality micro zone based on a comparison with configurations parameters that include the good quality zone threshold, i.e., $\gamma_{Th\_GQ}$, and the bad quality zone threshold, i.e., $\pi_{Th\_BQ}$. In an exemplary embodiment, if signal quality predicted for a micro zone is greater than or equal to the good quality zone threshold, i.e., $\gamma_{Th\_GQ}$, the micro zone is categorized as good quality micro zone. Further, if the signal quality predicted for a micro zone is between good quality zone threshold, i.e., $\gamma_{Th\_GQ}$ and bad quality zone threshold, i.e., $\pi_{Th\_GQ}$, the micro zone is categorized as a medium quality micro zone. However, if the signal quality predicted for a micro zone is less than or equal to the bad quality zone threshold, i.e., $\pi_{Th\_BQ}$, then the micro zone is categorized as bad quality micro zone. The good quality zone threshold and the bad quality zone threshold are determined based on signal strength of the BS.

Predictive quality micro zone module 216 then communicates the signal quality predicted for each blind micro zone to blind zone coverage verification module 218 for verification and adjustment of signal strength of the BS. Thereafter, blind zone coverage verification module 218 verifies signal quality predicted for a blind micro zone with threshold limit of signal error deviation, i.e., $\text{Sig}_\delta$. In an exemplary embodiment, blind zone coverage verification module 218 determines whether error in the signal strength predicted for a blind micro zone, i.e., $\text{SigBZ}_{err}$ for timer for algorithm trigger at $\delta_{Atm-1}$ and $\delta_{Atm}$ is within the threshold limit of signal error deviation i.e, $\text{Sig}_\delta$. If the error is within the threshold limit of signal error deviation, then prediction of signal quality made by predictive quality micro zone module 216 for that blind micro zone is assumed to be correct. However, if the error exceeds or is below the threshold limit of signal error deviation, then the error in the signal strength for the blind micro zone is recalculated such that it is within the threshold limit of signal error deviation, i.e, $\text{Sig}_\delta$, for every timer for algorithm trigger.

Thereafter, coverage mapping module 220 communicates with UE zone module 212 and blind zone coverage verification module 218 to receive information regarding signal quality of each LIE micro zone and each blind micro zone within the coverage area of the BS to create a radio coverage map. Coverage mapping module 220 then sends this information to management application 202. In an embodiment, the above described functionalities of modules within network coverage module 200 are performed by one or more processors within the BS.

As the coverage area of the BS is divided into multiple micro zones and macro zones, signal measurement reports received from these micro and macro zone help in accurate and efficient classification of radio coverage map. These signal measurement reports include combination of signal parameters, for example, of RSRP, HF, and RLF, as a result, the determination of radio coverage is precise, thereby, reducing error in creating the radio coverage map. Additionally, as for blind micro zones, signal quality is predicted and then later verified, a holistic view of the coverage area is provided, which otherwise would have been left blank in conventional methods and systems.

FIG. 3 illustrates a portion of coverage area of the BS divided into micro zones and macro zones, in accordance with an exemplary embodiment. It will be apparent to a person skilled in the art that the invention is not limited to the exemplary embodiment disclosed herein.

As explained in detail in conjunction with FIG. 2, coverage area 302 of the BS is divided into 24 micro zones that are equilateral triangles of same size, i.e., micro zones 304 to 350. The system as disclosed in FIG. 2 collates these 24 micro zones into four hexagonal macro zones, such that each macro zone includes six micro zones. Thus, micro zones 304, 306, 308, 310, 312, and 314 are collated to create a macro zone 352. Similarly, a macro zone 354 includes micro zones 316, 318, 320, 322, 324, and 326; a macro zone 356 includes micro zones 328, 330, 332, 334, 336, and 338; and a macro zone 358 includes micro zones 340, 342, 344, 346, 348, and 350.

In this exemplary embodiment, micro zone 340 is a blind micro zone, thus for estimation of signal quality of micro zone 340, macro zones 352, 354, 356, and 358 are selected as one or more set of neighboring micro zones, such that each of macro zones 352, 354, 356, and 358 is a set of neighboring micro zone.

FIG. 4 illustrates a flowchart of a method for determining radio coverage in a wireless communication network, in accordance with an embodiment. To determine the radio coverage for a BS, firstly a plurality of micro zones of equal size are identified within the coverage area of the BS. After identification of the plurality of micro zones, a plurality of macro zones are also identified. A macro zone includes one or more micro zones. This is explained in detail in conjunction with FIG. 5.

Thereafter, signal measurement reports for each micro zone are collected from one or more UEs in each micro zone within the coverage area of the BS. Based on the signal measurement reports, at 402 each micro zone within the coverage area of the BS is categorized as one of a UE micro zone and a blind micro zone. A UE micro zone is associated with one or more signal measurement reports and a blind micro zone is not associated with any signal measurement report. In other words, for a UE micro zone at the minimum one signal measurement report is received, however, for a blind micro zone no such signal measurement report is received. Thus, every micro zone within the coverage area of the BS is categorized either as a UE micro zone or as a blind micro zone.

Based on signal measurement reports associated with a micro zone and one or more configuration parameters, a predefined set of signal parameters are computed for the micro zone. This is repeated for each micro zone in each sector within the coverage area of the BS. The one or more configuration parameter are selected from a group including threshold number of signal measurement reports, time duration for collecting signal measurement reports, transmission power of the BS, size of a micro zone, signal quality factor of a micro zone, good quality micro zone threshold, bad quality micro zone threshold, distance factor of a micro zone, and number of sectors in the coverage area of the BS. The configuration parameters have been explained in detail in conjunction with FIG. 2. Further, the predefined set of signal parameters include average HF, average RLF, RSRP, and average signal strength.

For a UE micro zone within the plurality of micro zones, signal quality is determined based on the predefined set of signal parameters extracted from a predefined threshold number of signal measurement reports received from the UE micro zone. Similarly, signal quality is determined for each UE micro zone within the coverage area of the BS. The determination of signal quality for each UE micro zone is further explained in detail conjunction with FIG. 5. With regards to a blind micro zone within the plurality of micro zones, at 404, signal quality of the blind micro zone is estimated based on signal quality of one or more set of neighboring micro zones surrounding the blind micro zone. The signal quality of each set of neighboring micro zones is determined based on the predefined set of signal parameters extracted from corresponding signal measurement reports. In an exemplary embodiment, a set of neighboring micro zones is a hexagonal macro zone that includes six micro zones of the shape of an equilateral triangle. In this exemplary embodiment, a blind micro zone is thus surrounded by four hexagonal macro zones, each including six micro zones. This is further explained in detail in conjunction with FIG. 6.

FIG. 5 illustrates a flowchart of a method for determining radio coverage in a wireless communication network, in accordance with another embodiment. To determine the radio coverage for a BS, at 502, a plurality of micro zones of equal size are identified within the coverage area of the BS. After identification of the plurality of micro zones, a plurality of macro zones are also identified. A macro zone includes one or more micro zones. In an exemplary embodiment, each micro zone is an equilateral triangle of equal size. Thus, a macro zone is hexagonal in shape and includes six micro zones. In other words, when micro zones have shape of equilateral triangles of equal size, macro zones have the shape of a hexagon. The plurality of micro zones are identified based on transmission power of the BS and the number of sectors within the coverage area of the BS. In an exemplary embodiment, the plurality of micro zones and the plurality of macro zones are identified as described below:

Step 1: Extract configuration parameters that include the BS transmission power, i.e., $\rho_{BS\_Tx}$, and the number of sectors, i.e., $\sigma_{BS\_Sec}$.

Step 2: Calculate the coverage area of the BS using the configuration parameter: $\rho_{BS\_Tx}$ Step 3: Divide the coverage area into sectors using the configuration parameter: $\sigma_{BS\_Sec}$ Step 4: Create the plurality of micro zones:

Divide each sector into the plurality of micro zones of the shape of equilateral triangles of equal size, where the size of a micro zone is calculated using equation 3 and the number of micro zones in the coverage area of the BS is calculated using equation 4 given below:

$$\omega_{Sz} = (\sqrt{3}/4 * (Cell_{Rad}/n)^2 \quad (3)$$

where, $\omega_{Sz}$=Size of a micro zone;

$Cell_{Rad}$=Radius of the coverage area of the BS;

n=number of division of $Cell_{Rad}$ and n being equal to 2, 4, 8, . . . m.

$$Mic\_Num = 2^n \quad (4)$$

where,

Mic_Num=total number of micro zones.

Step 5: Create the plurality of Macro zones:

For a micro zone in a sector within the coverage area of the BS, a macro zone is created by collating five neighboring micro zones surrounding the micro zone. This step is repeated till all micro zones in all sectors within the coverage area of the BS have been covered.

For example, with reference to FIG. 3, coverage area 302 is divided into 24 equilateral triangular micro zones 304 to 350, which are further collated to create four hexagonal macro zones, i.e., macro zones 352, 354, 356, and 358.

Thereafter, at 504 signal measurement reports for each micro zone are collected from one or more UEs in each micro zone within the coverage area of the BS. Based on the signal measurement reports, at 506 each micro zone within coverage area is categorized as one of a UE micro zone and a blind micro zone. A UE micro zone is associated with one or more signal measurement reports and a blind micro zone is not associated with any signal measurement report. At 508, based on signal measurement reports associated with a micro zone and one or more configuration parameters, a predefined set of signal parameters are computed for the micro zone. This is repeated for each micro zone in each sector within the coverage area of the BS. For example, with reference to FIG. 3, predefined set of signal parameters are computed for each of micro zones 304 to 350 within coverage area 302.

At 510, signal quality is determined for a UE micro zone within the plurality of micro zones based on the predefined set of signal parameters extracted from a predefined threshold number of signal measurement reports received from the UE micro zone. Similarly, signal quality is determined for each UE micro zone within the coverage area of the BS. In an exemplary embodiment, signal quality of a UE micro zone is determined as described below:

Step 1: Initiate micro zone stale timer, i.e., $\phi_{Stm}$

Step 2: Calculate the predefined set of signal parameters for the UE micro zone that include:
(i) Average signal strength
(ii) Average RLF
(iii) Average HF
(iv) Total number of samples of signal measurement reports, i.e., $Sam_{num}$ This step is repeated for each LIE micro zone till the predefined set of signal parameters are calculated for total number of LIE micro zone which will be less than equal to the total number of micro zones, i.e., Mic_Num Step 3: For the sector that includes the UE micro zone, calculate the following:
(i) Average RLF
(ii) Average HF This step is repeated for each sector till the above given parameters are calculated for the total number of sectors, i.e., $\sigma_{BS\_Sec}$.

Step 4: For the LIE micro zone, if on expiry of $\delta_{Atm}$, $Sam_{num} > \alpha_{Th\_R}$ (threshold number of signal measurement reports), then signal parameters calculated for the UE micro zone and the sector at step 2 and step 3 are stored in a UE micro zone report, i.e., $ZDB_{Q\_th}$.

This step is repeated for the total number of LIE micro zones, which is less than equal to the total number of micro zones, i.e., Mic_Num. The signal parameters calculated for each UE micro zone are then stored in $ZDB_{Q\_th}$.

Step 5: Using $ZDB_{Q\_th}$, calculate the signal quality of the UE micro zone using equation 5 given below:

$$QMZ = ASS_M * (ARLF_M/ARLF_{Sec}) * (AHF_M/AHF_{Sec}) * \Omega_{Micro\_Q} \quad (5)$$

where,
QMZ=the signal quality of the UE micro zone;
$ASS_M$=Average signal strength for the LIE micro zone;
$ARLF_M$=Average radio link failure for the LIE micro zone;
$ARLF_{Sec}$=Average radio link failure for the sector that includes the UE micro zone;
$AHF_M$=Average handover failure for the UE micro zone;
$AHF_{Sec}$=Average handover failure for the sector that includes the UE micro zone;
$\Omega_{Micro\_Q}$=quality factor of the micro zone.

This step is repeated for the total number of UE micro zones in the coverage are and the total number of sectors, i.e., $\sigma_{BS\_Sec}$.

For example, with reference to FIG. 3, micro zone 340 is the only blind micro zone amongst micro zones 304 to 350.

Thus, signal quality is computed using the above exemplary embodiment for micro zone 304 to 350, excluding blind micro zone 340. At 512, the UE micro zone is categorized as one of good quality micro zone, medium quality micro zone, and bad quality micro zone based on comparison of signal quality of the LIE micro zone with good quality zone threshold and bad quality zone threshold. Similarly, each UE micro zone within the coverage area of the BS is categorized as one of a good quality micro zone, a medium quality micro zone, and a bad quality micro zone. In an exemplary embodiment, a LIE micro zone is categorized as described below:

Step 1 Calculate the function given in equation 6 given below:

$$fn(MicroZone_{Dist1}, \beta_{Micro\_Dist}) \quad (6)$$

where,
$MicroZone_{Dist}$=distance of the UE micro zone from the BS;
$\beta_{Micro\_Dist}$=micro zone distance factor;
fn=a function dependent on parameter $MicroZone_{Dist}$ and $\beta_{Micro\_Dist}$.

Step 2: Categorize the UE micro zone as good quality micro zone, medium quality micro zone, and bad quality micro zone using equations 7 and equation 8;

$$QMZ > ((\gamma_{Th\_GQ}) * fn(MicroZone_{Dist}, \beta_{Micro\_Dist})) \quad (7)$$

$$QMZ > ((\pi_{Th\_BQ}) * fn(MicroZone_{Dist}, \beta_{Micro\_Dist})) \quad (8)$$

where,
QMZ=the signal quality of the UE micro zone;
$\gamma_{Th\_GQ}$=good quality zone threshold;
$\pi_{Th\_BQ}$=bad quality zone.

If the equation 7 is true, the UE micro zone is categorized as good quality micro zone. Further, if the equation 8 is true, then the UE micro zone is categorized as bad quality micro zone. However, if the equation 8 is false, then the UE micro zone is categorized as medium quality micro zone. Step 1 and step 2 are repeated for the total number of LIE micro zones and the total number of sectors, i.e., $\sigma_{BS\_Sec}$.

After the signal quality of each LIE micro zone has been calculated and each LIE micro zone has been categorized, at 514, signal quality of a blind micro zone within the plurality of micro zones is estimated. Similarly, signal quality of each blind micro zone within the coverage area of the BS is estimated. For example, with reference to FIG. 3, as coverage area 302 includes only one blind micro zone, i.e., micro zone 340, signal quality estimation is done only for micro zone 340. Thereafter, at 516, the blind micro zone is categorized as a good quality micro zone, a bad quality micro zone, and a medium quality micro zone. These are further explained in detail in conjunction with FIG. 6. At 518, a radio coverage map is created for the coverage area of the BS based on the signal quality determined for the UE micro zone and the signal quality estimated for the blind micro zone. In an exemplary embodiment, the radio coverage map is created as describe below:

Step 1: Extract the signal quality information for each UE micro zone within the coverage area of the BS based on the categorization of each UE micro zone as good quality micro zone, a bad quality micro zone, and a medium quality micro zone.

Step 2: Create a radio coverage map for all UE micro zones within the coverage area of the BS.

Step 3: Extract the signal quality information for each blind micro zone within the coverage area of the BS based on the categorization of each blind micro zone as good quality micro zone, a bad quality micro zone, and a medium quality micro zone.

Step 4: Create a radio coverage map for all blind micro zones within the coverage area of the BS.

Step 5: Communicate the radio coverage map for all UE micro zones and all blind micro zones to management application 202.

For example, with reference to FIG. 3, radio coverage map is created for coverage area 302 using categorization of micro zone 304 to 350, where except micro zone 340, each micro zone is a UE micro zone.

As the coverage area of the BS is divided into multiple micro zones and macro zones, signal measurement reports received from these micro and macro zone help in accurate and efficient classification of radio coverage map. These signal measurement reports include combination of signal parameters, for example, of RSRP, HF, and RLF, as a result, the determination of radio coverage is precise, thereby, reducing error in creating the radio coverage map.

FIG. 6 illustrates a flowchart of a method for estimating signal quality of a blind micro zone, in accordance with an embodiment. At 602 a signal quality factor for a set of neighboring micro zones surrounding the blind micro zone is determined. The signal quality factor is determined for each of the one or more set of neighboring micro zones. In an exemplary embodiment, the set of neighboring micro zones is a macro zone as explained before in FIG. 4 and FIG. 5 above. In this exemplary embodiment, signal quality factor is determined for four macro zones surrounding the blind micro zone. For example, with reference to FIG. 3, micro zone 340 is a blind micro zone, therefore, signal quality factor is determined for each of macro zones 352, 354, 356, and 358. In other words, each of macro zones 352, 354, 356, and 358 is a set of neighboring micro zones.

The signal quality factor for the set of neighboring micro zones surrounding the blind micro zone is determined based on average RLF and average HF of the set of neighboring micro zones. Additionally, to determine the signal quality factor, signal quality deviation between actual signal quality of a UE micro zone associated with maximum number of signal measurement reports within the set of neighboring micro zones and an average estimated signal quality of the set of neighboring micro zones is calculated. This signal quality deviation is then compared with threshold deviation of the BS determined based on the signal strength of the BS. In an exemplary embodiment, the signal quality factor is determined using the method described below:

Step 1: Create a hexagonal macro zone that includes five neighboring micro zones surrounding a blind micro zone in addition to the bind micro zone.

This step is then repeated for the total number of blind micro zones and the total number of sectors, i.e., $\sigma_{BS\_Sec}$.

Step 2: Initiate time for algorithm trigger, $\delta_{Atm}$ and execute step 3 to step 6 till expiry of $\delta_{Atm}$.

Step 3: Determine a LIE micro zone within the macro zone for which maximum number of signal measurement reports has been received. Calculate actual signal quality, $Q_{mi\_act}$, of the UE micro zone.

Step 4: Estimate signal quality, $Q_{mi\_est}$, of four neighboring macro zones surrounding the blind micro zone.

Step 5: Calculate signal quality deviation using equation 9 given below:

$$Q_{Dev.}=ABS(Q_{mi\_act.}-Q_{mi\_est.}) \quad (9)$$

where,
$Q_{Dev}$=signal quality deviation;
$Q_{mi\_act}$=actual signal quality of the UE micro zone;
$Q_{mi\_est}$=estimated signal quality of four surrounding macro zones Step 6: If $Q_{Dev}<Q_{Dev\_Th}$, then macro zone quality factor, i.e., $\mu_{Macro\_Q}$, is unchanged, else $\mu_{Macro\_Q}$ is adjusted.

where,
$Q_{Dev\_Th}$=threshold deviation of the BS.

Step 3 to step 6 are repeated for all the macro zones created for all blind micro zone within the total number of sectors, i.e., $\sigma_{BS\_Sec}$.

At 604, the signal quality of the blind micro zone is predicted, which includes computing, at 604a, an average signal quality of the one or more set of neighboring micro zones. In an exemplary embodiment, a set of neighboring micro zones is a macro zone that includes such neighboring micro zones surrounding the blind micro zone. For example, with reference to FIG. 3, for blind micro zone 340, a set of neighboring micro zone is macro zone 358 that includes five micro zones, i.e., micro zones 342, 346, 348, and 350, in addition to blind micro zone 340.

The average signal quality is computed based on average RLF of a sector that includes the one or more set of neighboring micro zones. Computation of average signal quality additionally requires average signal strength, average RLF, and average HF of the one or more set of neighboring micro zones and a signal quality factor determined for each of the one or more set of neighboring micro zones. In an exemplary embodiment, when a set of neighboring micro zones is a macro zone, then the average signal quality is computed for four neighboring macro zones surrounding the blind micro zone. In another exemplary embodiment, for a blind micro zone an average signal quality is computed for four neighboring macro zones surrounding the blind micro zone using the method described below:

Step 1: For the blind micro zone, determine four neighboring macro zones surrounding the blind micro zone.

Step 2: For each of these four neighboring macro zones, calculate following predefined signal parameters
(i) Average signal strength
(ii) Average HF
(iii) Average RLF Step 3: Calculate signal quality of a neighboring macro zone using equation 10 given below:

$$QMaZ=ASS_{Ma}*(ARLF_{Ma}/ARLF_{Sec})*(AHF_{Ma}/(AHF_{Sec})*\mu_{Macro\_Q} \quad (10)$$

where,
QMaZ=the signal quality of the neighboring macro zone;
$ASS_{Ma}$=Average signal strength for the neighboring macro zone;
$ARLF_{Ma}$=Average radio link failure for the neighboring macro zone;
$ARLF_{Sec}$=Average radio link failure for the sector that includes the neighboring macro zone;
$AHF_{Ma}$=Average handover failure for the neighboring macro zone;
$AHF_{Sec}$=Average handover failure for the sector that includes the neighboring macro zone;
$\mu_{Macro\_Q}$=quality factor of a macro zone.

This calculation is performed for each of the four neighboring macro zones surrounding the blind micro zone. For example, with reference to FIG. 3, for blind micro one 340, this calculation is made for macro zones 352, 354, 356, and 358.

Step 4: Calculate average signal quality for the four neighboring macro zones using equation 11 given below:

$$QMaZ_{avj} = \Sigma QMaZ_k/4 \qquad (11)$$

where,
QMaZ$_{avj}$=average signal quality for the four neighboring macro zones;
QMaZ$_k$=signal quality of a neighboring macro zone; k=1, 2, 3, 4

Thereafter, at 604b, the blind micro zone is categorized as one of good quality micro zone, medium quality micro zone, and bad quality micro zone based on the average signal quality of the one or more set of neighboring micro zones, distance of the blind zone from the BS, the good quality zone threshold, and the bad quality zone threshold. In an exemplary embodiment, a blind micro zone is categorized using the method described below:

Step 1 Calculate the function in equation 12 given below:

$$fn(MicroZone_{Dist}, \beta_{Micro\_Dist}) \qquad (12)$$

where,
MicroZone$_{Dist}$=Distance of the blind micro zone from the BS;
β$_{Micro\_Dist}$=micro zone distance factor;
fn=a function dependent on parameter MicroZone$_{Dist}$ and ρ$_{Micro\_Dist}$.

Step 2: Categorize the blind micro zone as good quality micro zone, medium quality micro zone, and bad quality micro zone using equations 13 and equation 14:

$$QMaZ_{avj} > ((\gamma_{TH\_GQ}) * fn(MicroZone_{Dist}, \beta_{Micro\_Dist})) \qquad (13)$$

$$QMaZ_{avj} > ((\pi_{Th\_BQ}) * fn(MicroZone_{Dist}, \beta_{Micro\_Dist})) \qquad (14)$$

where,
QMaZ$_{avj}$=average signal quality for the four neighboring macro zones;
γ$_{Th\_GQ}$=good quality zone threshold;
π$_{Th\_BQ}$=bad quality zone threshold.

If the equation 13 is true, the blind micro zone is categorized as good quality micro zone. Further, if the equation 14 is true, then the blind micro zone is categorized as bad quality micro zone. However, if the equation 14 is false, then the blind micro zone is categorized as medium quality micro zone. Step 1 and step 2 are repeated for the total number of blind micro zones and the total number of sectors, i.e., σ$_{BS\_Sec}$.

Thereafter, at 606, a check is performed to verify the signal quality predicted for the blind zone with threshold limit of signal error deviation. If the signal quality predicted is within the threshold limit of signal error deviation, at 608, signal quality predicted for the blind micro zone is considered as final predicted signal quality. In an exemplary embodiment, the verification is done using the method described below:

Step 1: For each timer for algorithm trigger, δ$_{Atm}$, if signal predicted for the blind micro zone at δ$_{Atm-1}$, i.e., SigBZ is available, calculate error in the predicted signal using equation 15 given below:

$$SigBZ_{err} = SigBZ(\delta_{Atm}) - SigBZ(\delta_{Atm-1}) \qquad (15)$$

where,
SigBZ$_{err}$=error in the signal predicted for the blind micro zone;
SigBZ(δ$_{Atm}$)=signal predicted at δ$_{Atm}$;
SigBZ(δ$_{Atm-1}$)=signal predicted at δ$_{Atm-1}$.

Step 2: Perform a check to determine whether SigBZ$_{err}$ is within the threshold limit of signal error deviation using equation 16 given below:

$$-Sig_\delta < SigBZ_{err} < Sig_\delta \qquad (16)$$

where,
Sig$_\delta$=threshold limit of signal error deviation for the predicted signal;
SigBZ$_{err}$=error in the signal predicted for the blind micro zone.

If equation 16 is true then the signal quality predicted for the blind micro zone, i.e., SigBZ, is considered as final predicted signal quality. Step 1 and step 2 are repeated for the total number of blind micro zones and the total number of sectors, i.e., σ$_{BS\_Sec}$.

In response to the verification, if signal quality predicted for the blind micro zone is not within the threshold limit of signal error deviation, at 610 a signal adjustment is performed for the blind micro zone. This is repeated for each blind micro zone within the coverage area of the BS. To perform the signal adjustment, steps given in 602 to 606 are repeated. In an exemplary embodiment, when equation 16 is false, control is returned back to step 1 of exemplary embodiment described under 602. This is repeated for the total number of blind micro zones and the total number of sectors, i.e., σ$_{BS\_Sec}$.

As the coverage area of the BS is divided into multiple micro zones and macro zones, signal measurement reports received from these micro and macro zone help in accurate and efficient classification of radio coverage map. Additionally, as for blind zones, signal quality is predicted and then later verified, a holistic view of the coverage area is provided, which otherwise would have been left blank in conventional methods and systems.

FIG. 7 illustrates an exemplary computing system 700 that may be employed to implement processing functionality for various embodiments (e.g., as a SIMD device, client device, server device, one or more processors, or the like). Those skilled in the relevant art will also recognize how to implement the invention using other computer systems or architectures. Computing system 700 may represent, for example, a user device such as a desktop, an activity mon monitoring device, a wearable portable electronic device, a mobile phone, personal entertainment device, DVR, and so on, or any other type of special or general purpose computing device as may be desirable or appropriate for a given application or environment. Computing system 700 can include one or more processors, such as a processor 702 that can be implemented using a general or special purpose processing engine such as, for example, a microprocessor, microcontroller or other control logic. In this example, processor 702 is connected to a bus 704 or other communication medium.

Computing system 700 can also include a memory 706 (main memory), for example, Random Access Memory (RAM) or other dynamic memory, for storing information and instructions to be executed by processor 702. Memory 706 also may be used for storing temporary variables or other intermediate information during execution of instructions to be executed by processor 702. Computing system 700 may likewise include a read only memory ("ROM") or other static storage device coupled to bus 704 for storing static information and instructions for processor 702.

Computing system 700 may also include storage devices 708, which may include, for example, a media drive 710 and a removable storage interface. The media drive 710 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 712 may include, for example, a hard disk, magnetic tape, flash drive, or other fixed or removable medium that is read by and written to by media drive 710. As these examples illustrate, storage media 712 may include a computer-readable storage medium having stored therein particular computer software or data.

In alternative embodiments, storage devices 708 may include other similar instrumentalities for allowing computer programs or other instructions or data to be loaded into computing system 700. Such instrumentalities may include, for example, a removable storage unit 714 and a storage unit interface 716, such as a program cartridge and cartridge interface, a removable memory (for example, a flash memory or other removable memory module) and memory slot, and other removable storage units and interfaces that allow software and data to be transferred from removable storage unit 714 to computing system 700.

Computing system 700 can also include a communications interface 718. Communications interface 718 can be used to allow software and data to be transferred between computing system 700 and external devices. Examples of communications interface 718 can include a network interface (such as an Ethernet or other NIC card), a communications port (such as for example, a USB port, a micro USB port), Near field Communication (NFC), etc. Software and data transferred via communications interface 718 are in the form of signals which can be electronic, electromagnetic, optical, or other signals capable of being received by communications interface 718. These signals are provided to communications interface 718 via a channel 720. Channel 720 may carry signals and may be implemented using a wireless medium, wire or cable, fiber optics, or other communications medium. Some examples of channel 720 include a phone line, a cellular phone link, an RF link, a Bluetooth link, a network interface, a local or wide area network, and other communications channels.

In this document, the terms "computer program product" and "computer-readable medium" may be used generally to refer to media such as, for example, memory 706, storage devices 708, removable storage unit 714, or signal(s) on channel 720. These and other forms of computer-readable media may be involved in providing one or more sequences of one or more instructions to processor 702 for execution. Such instructions, generally referred to as "computer program code" (which may be grouped in the form of computer programs or other groupings), when executed, enable computing system 700 to perform features or functions of embodiments of the present invention.

In an embodiment where the elements are implemented using software, the software may be stored in a computer-readable medium and loaded into computing system 700 using, for example, removable storage unit 714, media drive 710 or communications interface 718. The control logic (in this example, software instructions or computer program code), when executed by processor 702, causes processor 702 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments disclose methods and systems for determining radio coverage in wireless communication networks. The coverage area of the BS is divided into multiple micro zones and macro zones, as a result, signal measurement reports received from these micro and macro zone help in accurate and efficient classification of radio coverage map. These signal measurement reports include combination of signal parameters, for example, of RSRP, HF, and RLF, as a result, the determination of radio coverage is precise, thereby, reducing error in creating the radio coverage map. Additionally, as for blind zones, signal quality is predicted and then later verified, a holistic view of the coverage area is provided, which otherwise would have been left blank in conventional methods and systems.

The specification has described methods and systems for determining radio coverage in wireless communication networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for determining radio coverage in a wireless communication network, the method comprising:
    categorizing each of a plurality of micro zones within coverage area of a Base Station (BS) as one of a User Equipment (UE) micro zone and a blind micro zone based on signal measurement reports associated with the plurality of micro zones, a UE micro zone associated with at least one signal measurement report and a blind micro zone not associated with a signal measurement report; and estimating signal quality of a blind micro zone within the plurality of micro zones based on signal quality of at least one set of neighboring micro zones surrounding the blind micro zone, wherein the signal quality of each set of neighboring micro zones is determined based on a predefined set of signal parameters extracted from corresponding signal measurement reports.

2. The method of claim 1 further comprising identifying the plurality of micro zones of equal size based on transmission power of the BS and the number of sectors within the coverage area of the BS, the plurality of micro zones tessellating to overlay at least a portion of the coverage area of the BS.

3. The method of claim 1 further comprising determining signal quality of a UE micro zone within the plurality of micro zones based on the predefined set of signal parameters extracted from a predefined threshold number of signal measurement reports received from the UE micro zone.

4. The method of claim 1 further comprising:
collecting signal measurement reports for a micro zone from at least one UE in the micro zone; and
computing the predefined set of signal parameters for the micro zone based on the signal measurement reports of the micro zone and at least one configuration parameter.

5. The method of claim 4, wherein the at least one configuration parameter is selected from a group comprising threshold number of signal measurement reports, time duration for collecting signal measurement reports, transmission power of the BS, size of a micro zone, signal quality factor of a micro zone, good quality zone threshold, bad quality zone threshold, distance factor of a micro zone, and number of sectors in the coverage area of the BS.

6. The method of claim 4, wherein the predefined set of signal parameters comprise average Handover Failure (HF), average Radio Link Failure (RLF), Reference Signal Received Power (RSRP), and average signal strength.

7. The method of claim 1 further comprising categorizing the UE micro zone as one of good quality micro zone, medium quality micro zone, and bad quality micro zone based on comparison of signal quality of the UE micro zone with good quality micro zone threshold and bad quality micro zone threshold.

8. The method of claim 1, wherein estimating the signal quality of the blind micro zone comprises determining a signal quality factor for a set of neighboring micro zones based on (i) average RLF and average HF of the set of neighboring micro zones, and (ii) comparison of signal quality deviation between actual signal quality of a UE micro zone associated with maximum number of signal measurement reports within the set of neighboring micro zones and an average estimated signal quality of the set of neighboring micro zones with threshold deviation of the BS, the threshold deviation being determined based on signal strength of the BS.

9. The method of claim 8 further comprising predicting the signal quality of the blind micro zone comprising:
computing an average signal quality of the at least one set of neighboring micro zones based on (i) average RLF of a sector comprising the at least one set of neighboring micro zones, (ii) each of average signal strength, average RLF, and average HF of the at least one set of neighboring micro zones, and (iii) a signal quality factor determined for each of the at least one set of neighboring micro zones; and
categorizing the blind zone as one of good quality micro zone, medium quality micro zone, and bad quality micro zone based on the average signal quality of the at least one set of neighboring micro zones, distance of the blind zone from the BS, good quality micro zone threshold, and bad quality micro zone threshold.

10. The method of claim 9 further comprising verifying the signal quality predicted for the blind zone with threshold limit of signal error deviation.

11. The method of claim 10 further comprising performing a signal adjustment for the blind micro zone, when the signal quality predicted for the blind micro zone is outside the threshold limit of signal error deviation.

12. The method of claim 1 further comprising creating a radio coverage map for the coverage area of the BS based on the signal quality determined for the UE micro zone and the signal quality estimated for the blind micro zone.

13. The method of claim 1, wherein the wireless communication network is a Long-Term Evolution (LTE) wireless network.

14. A Base Station (BS) in a wireless communication network, the BS comprising:
a processor configured to:
categorize each of a plurality of micro zones within coverage area of a Base Station (BS) as one of a User Equipment (UE) micro zone and a blind micro zone based on signal measurement reports associated with the plurality of micro zones, a UE micro zone associated with at least one signal measurement report and a blind micro zone not associated with a signal measurement report; and
estimate signal quality of a blind micro zone within the plurality of micro zones based on signal quality of at least one set of neighboring micro zones surrounding the blind micro zone, wherein the signal quality of each set of neighboring micro zones is determined based on a predefined set of signal parameters extracted from corresponding signal measurement reports.

15. The BS of claim 14, wherein the processor is further configured to identify the plurality of micro zones of equal size based on transmission power of the BS and the number of sectors within the coverage area of the BS, wherein the plurality of micro zones tessellate to overlay at least a portion of the coverage area of the BS.

16. The BS of claim 14, wherein the processor is further configured to determine signal quality of a UE micro zone within the plurality of micro zones based on the predefined set of signal parameters extracted from a predefined threshold number of signal measurement reports received from the UE micro zone.

17. The BS of claim 16, wherein the processor is further configured to determine the at least one configuration parameter, the at least one configuration parameter being selected from a group comprising threshold number of signal measurement reports, time duration for collecting signal measurement reports, transmission power of the BS, size of a micro zone, signal quality factor of a micro zone, good quality micro zone threshold, bad quality micro zone threshold, distance factor of a micro zone, and the number of sectors in the coverage area of the BS.

18. The BS of claim 14, wherein the processor is further configured to:
collect signal measurement reports for a micro zone from at least one UE in the micro zone; and compute the predefined set of signal parameters for the micro zone based on the signal measurement reports of the micro zone and at least one configuration parameter.

19. The BS of claim 14, wherein the processor is further configured to categorize the UE micro zone as one of good quality micro zone, medium quality micro zone, and bad quality micro zone based on comparison of signal quality of the UE micro zone with good quality micro zone threshold and bad quality micro zone threshold.

20. The BS of claim 14, wherein the processor is further configured to determine a signal quality factor for a set of neighboring micro zones based on (i) average RLF and average HF of the set of neighboring micro zones, and (ii) comparison of signal quality deviation between actual signal quality of a UE micro zone associated with maximum number of signal measurement reports within the set of neighboring micro zones and an average estimated signal quality of the set of neighboring micro zones with threshold deviation of the BS, the threshold deviation being determined based on signal strength of the BS.

21. The BS of claim 20, wherein the processor is further configured to predict signal quality of the blind micro zone, the processor being further configured to:
compute an average signal quality of the at least one set of neighboring micro zones based on (i) average RLF of a sector comprising the at least one set of neighboring micro zones, (ii) each of average signal strength, average RLF, and average HF of the at least one set of neighboring micro zones, and (iii) a signal quality factor determined for each of the at least one set of neighboring micro zones; and
categorize the blind zone as one of good quality micro zone, medium quality micro zone, and bad quality micro zone based on the average signal quality of the at least one set of neighboring micro zones, distance of the blind zone from the BS, good quality micro zone threshold, and bad quality micro zone threshold.

22. The BS of claim 21, wherein the processor is further configured to verify the signal quality predicted for the blind zone with threshold limit of signal error deviation.

23. The BS of claim 22, wherein the processor is further configured to perform a signal adjustment for the blind micro zone, when the signal quality predicted for the blind micro zone is outside the threshold limit of signal error deviation.

24. The BS of claim 14, wherein the processor is further configured to create a radio coverage map for the coverage area of the BS based on the signal quality determined for the UE micro zone and the signal quality estimated for the blind micro zone.

25. A non-transitory computer-readable storage medium for determining radio coverage in a wireless communication network, when executed by a computing device, cause the computing device to:
categorize each of a plurality of micro zones within coverage area of a Base Station (BS) as one of a User Equipment (UE) micro zone and a blind micro zone based on signal measurement reports associated with the plurality of micro zones, a UE micro zone associated with at least one signal measurement report and a blind micro zone not associated with a signal measurement report; and
estimate signal quality of a blind micro zone within the plurality of micro zones based on signal quality of at least one set of neighboring micro zones surrounding the blind micro zone, wherein the signal quality of each set of neighboring micro zones is determined based on a predefined set of signal parameters extracted from corresponding signal measurement reports.

* * * * *